United States Patent [19]

Besecke et al.

[11] 4,373,056
[45] Feb. 8, 1983

[54] AQUEOUS ARTIFICIAL RESIN DISPERSIONS FREE OF EMULSIFYING AGENTS

[75] Inventors: Siegmund Besecke, Darmstadt; Herbert Fink, Bickenbach; Norbert Sutterlin, Ober-Ramstadt; Gerhard Markert, Ober-Ramstadt-Eiche; Gunter Schroder, Ober-Ramstadt; Willi Tilch, Reinheim, all of Fed. Rep. of Germany

[73] Assignee: Rohm GmbH Chemische Fabrik, Darmstadt, Fed. Rep. of Germany

[21] Appl. No.: 295,544

[22] Filed: Aug. 24, 1981

[30] Foreign Application Priority Data

Sep. 19, 1980 [DE] Fed. Rep. of Germany ....... 3035375

[51] Int. Cl.³ .............................................. C08L 41/00
[52] U.S. Cl. .................................... 524/547; 524/814; 526/240; 526/287
[58] Field of Search ............... 260/29.6 SQ; 526/287; 524/547

[56] References Cited

U.S. PATENT DOCUMENTS

| 3,931,087 | 1/1976 | Baatz et al. ................. 260/29.6 SQ |
| 4,012,560 | 3/1977 | Baatz et al. ......................... 428/474 |
| 4,296,016 | 10/1981 | Randin et al. ............... 260/29.6 SQ |

FOREIGN PATENT DOCUMENTS

| 2549840 | 5/1977 | Fed. Rep. of Germany . |
| 2235115 | 1/1975 | France . |
| 1197323 | 7/1970 | United Kingdom . |
| 1229510 | 4/1971 | United Kingdom . |
| 1411465 | 10/1975 | United Kingdom . |
| 1433064 | 4/1976 | United Kingdom . |

*Primary Examiner*—Harry Wong, Jr.
*Assistant Examiner*—Bernard Lipman
*Attorney, Agent, or Firm*—Oblon, Fisher, Spivak, McClelland & Maier

[57] ABSTRACT

An aqueous artificial resin dispersion, comprising an aqueous phase and a water-insoluble disperse phase formed from particles containing a copolymer formed in substantial part from a water insoluble or slightly soluble first monomer, wherein the copolymer additionally is formed from a second monomer of the formula

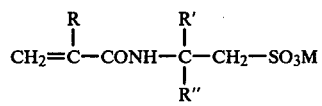

wherein R represents hydrogen or methyl, R' represents hydrogen or an alkyl radical with 1 to 12 C-atoms, R" represents an alkyl radical with 7 to 20 C-atoms, and M represents a proton, an alkali metal ion, or an ammonium ion, with the proviso that the aqueous phase is free of low molecular weight, ionic emulsifying agents. Such dispersions are particularly well suited for continuous emulsion polymerization because of the highly stable monomer emulsions formed by mixtures produced according to the invention.

12 Claims, No Drawings

AQUEOUS ARTIFICIAL RESIN DISPERSIONS FREE OF EMULSIFYING AGENTS

BACKGROUND OF THE INVENTION

1. Field of the Invention

This invention relates to aqueous artifical resin dispersions that do not contain low molecular weight emulsifying agents and more particularly to those dispersions containing a dispersed polymer having ionic or ionizable groups attached to the polymer chain.

2. Description of the Prior Art

It is known that one can largely eliminate low molecular weight emulsifiers or dispersants in the production of aqueous artificial resin dispersions if the dispersed artificial resin contains units having ionic groups, especially alkali metal sulfonates. Nevertheless, prior to the present invention no one had yet succeeded in completely eliminating low molecular weight emulsifying agents in such dispersions. In fact, small amounts of low molecular weight anionic emulsifying agents have been previously considered to be indispensable if standardization of particle size is desired. The phrase "low molecular weight" when applied to emulsifiers or dispersants of the ionic or non-ionic type in this application refers to compounds having molecular weights under 2,000.

As disclosed in German-OS No. 19 32 395, a stable lattice which does not contain a water-soluble wetting agent or surface active agent can be produced by polymerizing an aqueous emulsion of an unsaturated, largely water-insoluble monomer together with 0.1–5% by weight, based on the weight of monomer, of polymerizable organic sulfonic acids or alkali sulfonates of the formula $$R-Z-Q-SO_3M.$$

In this formula R is the polymerizable portion of the monomer, Z can be an oxygen atom or an ester or amide group, Q is an aliphatic or aromatic hydrocarbon residue, and M is hydrogen or an alkali metal ion. With a sufficient size of the group Q, the compound has soap-like properties. During emulsion polymerization these compounds acts in the same manner as low molecular weight emulsifying agents. Nevertheless, the monomers become captured in the polymer as it is formed so that the sulfonic acid-containing monomer is depleted from the aqueous phase by the end of the emulsion polymerization. Although the substance acts as an emulsifying agent during the emulsion polymerization, a small amount of known wetting agents, for example, alkali soaps, are jointly used to control particle size. The low molecular weight, non-polymerizable emulsifying agents occupy, for example, 0.4% of the aqueous phase.

T. H. Mills and R. Yocum have described in *Journal of Paint Technology*, 39, 532–35 (1967), the production of polymer dispersions with built-in units of 2-sulfoethyl methyacrylate. Although they have also attempted to eliminate low molecular weight emulsifying agents in order to obtain low foaming dispersions and films with limited hydrophilic properties produced therefrom, they could not eliminate anionic emulsifiers completely. They obtained a dispersion with relatively coarse particles, namely 2500 Å, by using 0.01 wt. %, based on monomer weight, of an anionic emulsifier. In order to obtain particle sizes of 700 Å, 1.25% of a low molecular weight emulsifying agent had to used concurrently with the disclosed sulfonate-containing monomers. Thus, the goal of obtaining a dispersion free from emulsifying agents was not attained.

The polymerizible emulsifying agent as disclosed above has not proved itself suitable for controlling particle size. While the particle size decreases with increasing amounts of the customary emulsifying agents, the opposite effect has been observed for sulfoethyl methyacrylate. Based on these experiences, the customary low molecular weight emulsifying agents have been utilized concurrently with the polymerizable sulfonic acids. German-OS No. 24 27 341 discloses the amounts of these additives to be no more than 0.2 wt. % (based on monomer). German-OS No. 22-50 517 describes the addition of from 0.3 to 3% of anionic emulsifiers in the production of artificial resin dispersions, in which the resin contains polymerized units derived from monomers having the formula $$CH_2=CH-CO-X-Y-SO_3M,$$

in which X is oxygen or a —NH— group, M is an alkali metal or ammonium ion, and Y is an alkyl radical with 2–10 C-atoms. The previously described sulfonate-group-containing monomers contained $C_4$-groups as Y. In the absence of further emulsifying agents—so teaches this reference (column 3, lines 36–59)—a large portion of a coagulate and a dispersion that is unstable in storage arise. It is further disclosed in French-PS No. 1 536 863 that the usual emulsifying agents must be used concurrently in the presence of monomers having following formula (R=H or methyl):

$$CH_2=CR-CONH-\underset{\underset{CH_3}{|}}{\overset{\overset{CH_3}{|}}{C}}-CH_2SO_3H.$$

Even though some of these publications disclose a considerable reduction in the emulsifying agent content when compared to similar artifical resin dispersions that do not contain built-in sulfonate groups, even then the detrimental effect of these emulsifying agents cannot be overlooked. As previously mentioned, the synthetic resin dispersions produced with the normal amounts of customary low molecular weight emulsifying agents produce relatively coarse particles. This is disadvantageous both for the stability of the dispersion and for the production of films from the dispersion. It is well known that emulsifying agents exert their effects even when they are present only in very minute amounts. They accelerate the penetration of water into the pores of a film made from the dispersion and thereby aid in its destruction through corrosion; this is particularly true of anionic emulsifying agents. It was the goal of the present invention to produce artificial resin dispersions which are free from low molecular weight ionic emulsifying agents and preferably also from non-ionic emulsifying agents, and which nevertheless have an optimal particle size, that is to say, one that can be selected in view of the technical application in question.

SUMMARY OF THE INVENTION

Accordingly, it is an object of this invention to provide a composition suitable for producing a stable emulsion of an artifical resin which does not include low molecular weight emulsifying agents.

This and other objects of the invention, as will hereinafter become more readily apparent, have been accomplished by providing an aqueous artifical resin dispersion, comprising an aqueous phase and a water-insoluble disperse phase formed from particles containing a copolymer formed in substantial part from a water insoluble or slightly soluble first monomer, wherein said copolymer additionally is formed from a second monomer of the formula

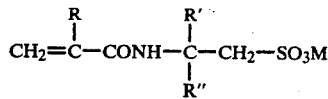

wherein R represents hydrogen or methyl, R' represents hydrogen or an alkyl radical with 1 to 12 C-atoms, R" represents an alkyl radical with 7 to 20 C-atoms, and M represents a proton, an alkali metal ion, or an ammonium ion, with the proviso that said aqueous phase is free of low molecular weight, ionizable emulsifying agents.

DESCRIPTION OF THE PREFERRED EMBODIMENTS

It was found that artificial resin dispersions with the desired properties could be produced when they have a composition comprising a water insoluble disperse phase of droplets containing a mixed polymer that is formed from a water-insoluble or slightly water soluble first monomer and a second monomer having the formula

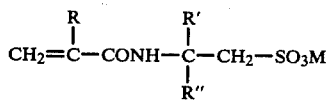

in which R is hydrogen or a methyl group, R' is hydrogen or an alkyl radical with 1–12 C-atoms, R" is an alkyl radical with 7–20 C-atoms, and M is a proton, an alkali metal ion, or an ammonium ion, and the aqueous phase of the dispersion is free of low molecular weight ionic emulsifying agents. When artificial resin dispersions have this composition, the particle size of the emulsion polymer can be as easily and surely controlled as with the presence of an ionic emulsifying agent normally used in emulsion polymerization. As is well known, the particle size and particle size distribution of the emulsion polymer depends on the emulsifying agent system present at the beginning of the polymerization. At this time, the sulfonic acid or sulfonate is still completely present as a low molecular weight compound. When the period of particle building has ended, the emulsifying agent system is thoroughly altered thereby, since the sulfonic acid or sulfonate is built into the polymer being produced. However, by that time the particle number, and with it the particle size, has been determined. Despite the presence of a diminished content of free low molecular weight emulsifying agents, the thus-produced dispersion remains stable as a result of the sulfonic acid or sulfonate groups now firmly built into the mixed polymer. While the previously disclosed amount of polymerizable sulfonic acid or sulfonate generally lay in the range of from 1–5 wt. % of the total monomer weight during polymerization—and especially when used as a supplement to non-polymerizable emulsifiers—the dispersion of the invention contains as a rule much smaller amounts of the claimed sulfonic acid or sulfonate, preferably between about 0.1–1 wt. %. In exceptional cases, this range can be higher or lower, but seldom extends beyond a range of 0.05–5 wt. %.

The polymerizable emulsifying agents included in the dispersion of the invention, characterized by the above formula, are, for example, synthesized according to the Ritter reaction from acrylonitrile or methacrylonitrile, a higher olefin or alcohol, and sulfuric acid. Suitable production methods are described in, for example, U.S. Pat. No. 3,544,597, which is hereby incorporated by reference, and German-OS No. 25 23 616. Especially useful are the components in which R' is H and R" is a straight chain alkyl radical with 8–12 C-atoms. Examples include 2-acrylamidodecanesulfonic acid, 2-acrylamidododecanesulfonic acid, and 2-acrylamidotetradecanesulfonic acid.

The major advantage of these compounds over similarly constructed compounds in which the radical R" is a short alkyl chain of 1–4 C-atoms, shows itself in the stability of the aqueous monomer emulsions that can be utilized in emulsion polymerization. Even a slight decrease in the stability of the monomer emulsion causes a significant decrease in the ability to control the particle size, thereby requiring the additional presence of another strongly emulsifying dispersion agent. This is shown in the following table, which shows the percent degree of mixing of aqueous emulsions of ethyl and n-butyl acrylate in the presence of ammonium persulfate with 0.1 or 0.25 wt. % of the emulsifying agents shown at 2 or 4 hours after preparation of the emulsion. The emulsions contained 62.5 wt. % of the respective monomers and had a pH between 4 and 7.5.

TABLE 1

| | | Percent Mixing of Aqueous Emulsion with | | | |
| | | 62.5% Ethyl acrylate (in Vol. %) | | 62.5% Butyl acrylate (in Vol. %) | |
| Polymerizable Emulsifying Agent | Amount Wt. % | After 2h | After 4h | After 2h | After 4h |
| --- | --- | --- | --- | --- | --- |
| Emulsions according to the invention | | | | | |
| 2-Acrylamido-decanesulfonic acid | 0.1 | <5 | <10 | <10 | <10 |
| | 0.25 | <5 | <10 | <10 | <10 |
| 2-Acrylamido-dodecanesulfonic acid | 0.1 | 1 | <10 | 1 | 3 |
| | 0.25 | 1 | <10 | 1 | 1 |
| 2-Acrylamido-tetradecanesulfonic acid | 0.1 | 1 | <5 | 0 | 0 |
| | 0.25 | 0 | <5 | 0 | 4 |
| Comparative Emulsions | | | | | |
| 2-Acrylamidobutane-sulfonic acid | 0.1 | 100 | 100 | 100 | 100 |
| | 0.25 | 100 | 100 | 70 | 90 |
| 2-Acrylamidohexane-sulfonic acid | 0.1 | 35 | 45 | 98 | 100 |
| | 0.25 | 80 | 85 | 90 | 100 |
| 2-Acrylamido-2,4,4-trimethylpentane-sulfonic acid | 0.1 | 90 | 100 | 60 | 80 |
| | 0.25 | 60 | 90 | 16 | 36 |

If increased stability against low temperatures or electrolytes is desired, the dispersions can contain the usual types of non-ionic emulsifiers, which in the rule are first added after polymerization and thereby do not exert an influence on the particle size. Typical emulsifying agents of this kind are adducts of ethylene oxide and alkyl phenols, fatty alcohols, fatty acids, or fatty amides, in which the number of ethylene oxide residues per molecule can vary in a wide range but generally lies between 10 and 200. Non-ionic emulsifying agents are weaker acting than ionic emulsifying agents on the foam content and the properties of films produced from the dispersions so that eliminating only the ionic emulsifying agents in many cases gives specific advantages. Nevertheless, the complete absence of low molecular weight emulsifying agents is even more advantageous. The above-described dispersions of the invention are free of emulsifying agents, in the sense used here, at the outset of polymerization.

Since the claimed emulsifying agents are generally able to carry out the role of the known low molecular weight anionic emulsifying agents used normally during emulsion polymerization, they can be utilized in the production of all known types of anionic or anionic-nonionic stabilized dispersions. The dispersed copolymer contains a substantial fraction of units of slightly- or non-water-soluble monomers. By slightly soluble is meant those monomers having solubilities in water up to 1 g/100 ml at 20° C. By substantial fraction is meant an amount sufficient to impart water-insolubility to the copolymer produced from such monomers. This fraction comprises in general at least 40 wt.% and more preferably at least 60 wt.% of the copolymer, based on the total weight of the polymerizable compounds. The remaining fraction of the monomers can be significantly or completely water soluble.

The slightly- or non-water-soluble monomers can be alkyl esters of acrylic or methacrylic acid, for example with 1-18 C-atoms in the alkyl radical, as previously described, as well as acrylo- and methacrylonitrile, styrene, α-methylstyrene, vinyltoluene, vinyl esters, such as vinyl acetate, formate, propionate, and butyrate, alkyl esters of maleic, fumaric, and itakonic acid, dienes, such as butadiene, isoprene, and cloroprene, olefins, such as ethylene, propylene, butylene, isobutylene, vinylchloride, and vinylidenechloride, or mixtures of two or more of these monomers with each other. The previously described dispersions are most preferably made of more than 60% and especially more than 80% of alkyl esters of acrylic and methacrylic acid, of which methyl, ethyl, n-propyl, isopropyl, n-butyl, isobutyl, hexyl, cyclohexyl, and 2-ethylhexyl are the most preferred esters.

The partially or completely water-soluble comonomers may be present in the dispersed copolymer in any amount that does not cause the copolymer to lose its property of being non-soluble in water. At most the copolymer may be rendered water-swellable. Suitable monomers include α, β-unsaturated mono- and dicarboxylic acids and their water soluble salts, such as acrylic, methacrylic, maleic, fumaric, or itaconic acids as well as their half-esters or half-amides, acrylamide, methacrylamide, low molecular weight hydroxyalkyl esters, and hydroxy-alkyl amides as well as low molecular weight aminoalkyl esters and aminoalkyl amides of unsaturated polymerizable carboxylic acids, vinylpyrolidine, vinylimidazole, vinylimidazoline, and vinylimidazolidine.

A further group of possible comonomers are the cross-linking monomers, which bear either two or more polymerizable groups, such as divinylbenzene, triallylcyanurate, and glycol diacrylate or dimethacrylate and suitable diesters of other glycols or polyols, or those that bear a cross-linkable group, such as N-methylolacrylamide or N-methylolmethacrylamide and their short chain alkyl esters, and glycidyl acrylate or methacrylate. The monomers of this group generally make up all together not more than 10 wt. % of the mixed polymer.

One particular advantage of the invention is that the known methods for the production of artificial resin dispersions emulsified by anionic agents can be utilized without alteration. In such cases the usual anionic emulsifiers are merely replaced by the claimed polymerizable emulsifying agents. The invention is also applicable to the numerous emulsion polymerization methods in which some or all of the monomers or particular monomers are added to the polymerization mixture either continuously or at particular times, for example at the beginning or at the end of the polymerization. It is especially suitable for methods of continuous emulsion preparation, in which at least a substantial part, and generally the preponderate part, of the monomer is added during polymerization in the form of an aqueous emulsion. With these methods the high stability of the aqueous monomer emulsion, given by the claimed polymerizable emulsifying agent, is especially advantageous.

The usual polymerization initiators, for example ammonium or potassium persulfate, hydrogen peroxide, or water soluble azo initiators, are utilized in the usual amounts, which generally lie between about 0.1 and 2 wt. %, based on the polymerizable monomer. Common polymerization temperatures are 50°–100° C., or lower when using redox-initiator systems. The polymerization reaction generally lasts about 1–6 hrs., including the final heating to complete the reaction. If the dispersion exhibits a high pH at the end of polymerization, for example through production of ammonia, the viscosity can increase noticably. Viscosity depends upon, among others, the content of the polymerized sulfonic acid. The viscosity generally lies in the range of from 10 to 50,000 mPa·sec.

The dispersed phase comprises 30–65 wt. % of the dispersion under favorable conditions, and is most desired to be between 45 and 60 wt. %, based on the total weight of the dispersion. The particle size of the dispersion generally lies between 0.05 and 1 μm, according to the amount of polymerizable emulsifying agent added, especially at the beginning of polymerization. An especially preferred particle size range lies between 0.05 and 0.6 μm. As is well recognized the particles will be present in different sizes rather than a single, uniform size. When a range is given it is meant that the particle diameters lie substantially within that range, i.e., at least 75% of the particles are within the given range. A single value for the diameter refers to the average size, unless otherwise specified.

The above disclosure generally describes the present invention. A more complete understanding can be obtained by reference to the following specific examples, which are provided herein for purposes of illustration only and are not intended to be limiting unless otherwise specified. In the following Examples 1 and 2, the stability of monomer emulsions prepared with emulsifying agents of the invention are compared to emulsions containing the less efficacious lower homologs of the emulsifying agent. In Examples 3–12, examples of production of dispersions according to the invention are described.

EXAMPLES

Example 1

The following components were combined in a 1-liter glass beaker and emulsified by means of a turbine stirrer at 4,000 rpm for 3 minutes: 240 parts deionized water, 1 part 2-acrylamidotetradecanesulfonic acid, 1 part ammonium persulfate, and 400 parts ethyl acrylate. After emulsification the pH value was adjusted to 5 with NaOH. The emulsion was still completely stable after two hours.

The homologs listed in the table shown below were used in further experiments instead of 2-acrylamidotetradecanesulfonic acid. In this and the following experiments the emulsion is considered to be stable when less than 10% mixing occurs in two hours.

| Inventive Emulsifiers | Mixing of the Emulsion After 2h |
|---|---|
| 2-Acrylamidotetradecane-sulfonic acid | stable |
| 2-Acrylamidododecane-sulfonic acid | stable |
| 2-Acrylamidodecane-sulfonic acid | stable |
| Comparative Examples | |
| 2-Acrylamido-2,4,4-trimethylpentanesulfonic acid. | 50% mixed |
| 2-Acrylamidohexane-sulfonic acid | 85% mixed |
| 2-Acrylamidobutane-sulfonic acid | 100% mixed |

Example 2

The following materials were emulsified in a 1-liter glass beaker by means of a turbine stirrer at 4,000 rpm for 3 minutes: 240 parts deionized water, 0.4 part 2-acrylamidotetradecanesulfonic acid, 1 part ammonium persulfate, 398 parts butyl acrylate, and 2 parts methacrylic acid. The emulsion was still completely stable after 2 hours.

Several homologs of 2-acrylamidotetradecanesulfonic acid were tested in an analogous manner. The stabilities of the corresponding emulsions are given in the following table:

| Polymerizable Emulsifiers | Mixing of the Emulsion After 2 hours |
|---|---|
| 2-Acrylamidotetradecane-sulfonic acid | stable |
| 2-Acrylamidododecane-sulfonic acid | stable |
| 2-Acrylamidodecane-sulfonic acid | stable |
| Comparative Examples | |
| 2-Acrylamido-2,4,4-trimethylpentanesulfonic acid | 20% mixed |
| 2-Acrylamidohexane-sulfonic acid | 90% mixed |
| 2-Acrylamidobutane-sulfonic acid | 100% mixed |

Example 3

Deionized water (158.6 parts) was heated to 80° C. with stirring in a 1-liter flask and the following were added: 0.16 part 2-acrylamidotetradecanesulfonic acid, 5 parts ethyl acrylate, and 1.6 parts of a 10% ammoniom persulfate solution. An emulsion of 240 parts deionized water, 1 part 2-acrylamidotetradecanesulfonic acid, 1 part ammonium peroxydisulfate, and 395 parts ethyl acrylate, adjusted to a pH of 5 with NaOH, was added dropwise over a 4 hour period at 80° C. Afterwards the mixture was cooled to room temperature. A stable, coagulate free dispersion with a solids-content of about 50% and a particle size of about 200 nm was obtained.

Comparative Example

This experiment was repeated with the difference that instead of 2-acrylamidotetradecanesulfonic acid similar amounts of the following shorter-chain-homologs were utilized: 2-acrylamido2,4,4-trimethylpentanesulfonic acid, 2-acrylamidohexanesulfonic acid, or 2-acrylamidobutanesulfonic acid. The dispersions coagulated during the dropwise addition of the partially or completely mixed emulsions.

Example 4

Deionized water (158.6 parts) was heated to 85° C. with stirring in a 1-liter flask and the following components were added: 0.06 part 2-acrylamidododecanesulfonic acid, 5 parts butyl acrylate, and 1.6 parts of a 10% solution of ammonium persulfate. An emulsion of 240 parts deionized water, 0.4 part 2-acrylamidododecanesulfonic acid, 1 part ammonium peroxydisulfate, 2.4 parts methacrylic acid, and 392.6 parts butyl acrylate was added dropwise in about 3.5 hours at this temperature. A stable, coagulate free dispersion with a solids-content of about 50% and a particle size of about 400 nm was obtained.

Example 5

Deionized water (158.6 parts) was heated to 80° C. with stirring in a 1-liter flask and the following components were added: 1 part 2-acrylamidododecanesulfonic acid, 2.5 parts ethyl acrylate, and 1.6 parts of a 10% solution of ammonium persulfate. Then at this temperature the following components were added dropwise in the form of an emulsion over a period of about 4 hours: 230 parts deionized water, 1 part 2-acrylamidododecanesulfonic acid, 0.96 part ammonium peroxydisulfate, 12 parts methacrylamide, 20 parts N-methylolmethacrylamide, and 368 parts ethyl acrylate. A stable, coagulate-free dispersion with a solids content of about 50% and a particle size of about 150 nm was obtained.

Comparative Example 5 with Non-Polymerizable Emulsifying Agents

Deionized water (158.6 parts) and 0.04 part of a tri-sec-butylphenol oxyethylated with about 7 moles of ethylene oxide and then sulfated were heated to 80° C. with stirring in a 1-liter flask and then mixed with 1.6 parts in a 10% solution of ammonium persulfate. An emulsion consisting of the following components was then added dropwise at this temperature in a period of about 4 hours: 230 parts deionized water, 6 parts of a tri-sec-butylphenol oxyethylated with about 7 moles of ethylene oxide and sulfated, 0.96 part ammonium persulfate, 12 parts methacrylamide, 20 parts N-methylolmethacrylamide, and 368 parts ethyl acrylate. A stable, coagulate-free dispersion with a solids-content of about 50% and a particle size of about 200 nm was obtained.

Comparison of the Properties Related to Technical Applications of the Dispersions According to Example 5 and Comparative Example 5

Method of Testing

Foam Volume: 100 ml of a dispersion thinned to 10 wt. % of dry content was stirred at 1380 rpm for one minute with a stirrer in a graduated cylindrical vessel.

The foam volume two minutes after cessation of stirring is given in ml.

Facture resistance and wet fracture resistance on impregnated filter paper is given according to DIN 53 112.

BTL—binder-trichloroethylene-loss: a textured polyester fabric was impregnated with the dispersion so that the binder on the surface of the fabric comprised 50 wt. % of the dry weight of the fabric. The amount of binder lost after washing with trichloroethylene is given in percent, based on the binder present at the beginning of the wash.

BWL—binder-water-loss: a similarly impregnated fabric was washed in boiling water, with the binder loss reported in percent.

Conclusions

| Dispersion | Emulsifier | Foam Volume (ml) | Fracture Resistance Wet(N) | Fracture Resistance Dry(N) | BTL (%) | BWL (%) |
|---|---|---|---|---|---|---|
| Example 5 | Polymerizable | 130 | 90 | 150 | 4 | 2 |
| Comparative Example 5 | Low Molecular Weight | 400 | 60 | 120 | 5 | 4 |

Example 6

Deionized water (155 parts), 0.8 part of 1% acetic acid, and 2 parts borax were heated to 80° C. with stirring in a 1-liter flask and then mixed with 0.4 part of 2-acrylamidodecanesulfonic acid, 5 parts vinyl acetate, and 4.8 parts of a 10% solution of ammonium persulfate. An emulsion consisting of the following components was then added at this temperature dropwise in about 6 hours: 320 parts deionized water, 2.4 parts 2-acrylamidodecanesulfonic acid, 1.2 parts ammonium peroxydisulfate, and 315 parts vinyl acetate. A stable, coagulate-free dispersion with a solids-content of about 40% and an average particle size of about 500 nm was obtained.

Example 7

Deionized water (158.2 parts) was heated to 85° C. with stirring in a 1-liter flask and then mixed with 0.16 part 2-acrylamidodecanesulfonic acid, 5 parts styrene, and 2 parts of a 10% solution of ammonium peroxydisulfate. An emulsion consisting of the following components was then added dropwise over a five hour period: 230 parts deionized water, 1 part 2-acrylamidodecanesulfonic acid, 1.2 parts ammonium persulfate, 191 parts styrene, 196 parts ethyl acrylate, and 8 parts methacrylamide. A stable, coagulate-free dispersion having a solids-content of about 50% and a particle size of about 250 nm was obtained.

Example 8

Deionized water (158.2 parts) was heated to 80° C. with stirring in a 1-liter flask and then combined with 0.16 part 2-acrylamidododecanesulfonic acid, 5 parts butyl acrylate, and 2 parts of a 10% solution of the sodium salt of 4,4'-azobis(4-cyanovaleric acid). An emulsion consisting of the following components was then added at this temperature dropwise over a period of about 5 hours: 230 parts deionized water, 2 parts 2-acrylamidododecanesulfonic acid, 1.6 parts of the sodium salt of 4,4'-azobis(4-cyanovaleric acid), 315 parts butyl acrylate, and 80 parts 2-dimethylaminoethyl methacrylate. A stable, coagulate-free dispersion with a solids-content of about 50% and a particle size of about 450 nm was obtained.

Example 9

Deionized water (158.6 parts) and 1.6 parts of sodium sulfate was heated to 80° C. with stirring in a 1-liter flask and then combined with 0.04 part 2-acrylamidotetradecanesulfonic acid, 5 parts butyl acrylate, and 1.6 parts of a 10% solution of ammonium persulfate. An emulsion consisting of the following components was then added at this temperature dropwise over a period of about 4 hours: 160 parts deionized water, 0.64 part 2-acrylamidotetradecanesulfonic acid, 0.72 part ammonium persulfate, 2.4 parts methacrylic acid, and 472.6 parts butyl acrylate. A stable, coagulate-free dispersion with a solids-content of about 60% and a particle size of about 750 nm was obtained.

Examples 10-12

(Control of Particle Size)

Deionized water (220 parts) and 2.25 parts of a 1% aqueous solution of 2-acrylamidotetradecanesulfonic acid was heated to 80° C. with stirring in a 1-liter flask and then mixed at this temperature with 0.225 part 2,2'-azobis(isobutyronitrile) dissolved in 5 parts of methyl methacrylate. An emulsion consisting of the following components was then added dropwise within a four hour period: 333 parts deionized water, 0.9 part 2-acrylamidotetradecanesulfonic acid, 445 parts methyl methacrylate, 2 parts 2,2'-azobis(isobutyronitrile) and 0.4 part 2-ethylhexyl thioglycolate. The dispersion was heated at 80° C. for 2 hours after the end of the emulsion addition and then cooled to room temperature. The experiment was then repeated with different amounts of 2-acrylamidotetradecanesulfonic acid at the beginning of the polymerization as shown in the following table. The particle sizes obtained with the different amounts of emulsifier are also shown in the following table.

| Example | Emulsifier (1% Aqueous Solution) | Particle Size |
|---|---|---|
| 10 | 2.25 parts | 520 nm |
| 11 | 6.75 parts | 370 nm |
| 12 | 22.5 parts | 250 nm |

The invention now being fully described, it will be apparent to one of ordinary skill in the art that many changes and modifications can be made thereto without departing from the spirit or scope of the invention as set forth herein.

What is claimed as new and desired to be secured by Letters Patent of the United States is:

1. An aqueous artificial resin dispersion, comprising:
   an aqueous phase free of low molecular weight, ionic emulsifying agents, and
   a water-insoluble disperses phase formed from particles containing a copolymer comprising (a) in substantial part a water-insoluble or slightly soluble first monomer selected from the group consisting of alkyl esters of acrylic or methacrylic acid, vinyl esters, and α-alkenylbenzenes and (b) from 0.05 to 5% by weight based on said copolymer of a polymerizable emulsifying agent of the formula

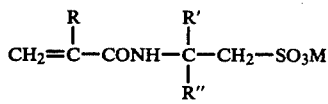

wherein R represents hydrogen or methyl,

R' represents hydrogen or an alkyl radical with 1 to 12 C-atoms,

R" represents an alkyl radical with 7 to 20 C-atoms, and

M represents a proton, an alkali metal ion, or an ammonium ion.

2. The dispersion of claim 1, wherein said copolymer comprises at least 40 wt % of said first monomer or a mixture of two or more of said first monomers.

3. The dispersion of claim 2, wherein said copolymer comprises at least 60 wt % of said first monomer or a mixture of two or more of said first monomers.

4. The dispersion of claim 3, wherein said first monomer is an alkyl ester of acrylic acid or methacrylic acid having 1 to 18 C-atoms in the alcohol residue of said ester, vinyl acetate, or styrene.

5. The dispersion of claim 3 wherein said copolymer comprises two or more monomers selected from the group consisting of alkyl esters of acrylic or methacrylic acid having 1 to 18 C-atoms in the alcohol residue of said ester, vinyl acetate, and styrene.

6. The dispersion of claim 1, wherein said aqueous phase is free of low molecular weight, non-ionic emulsifying agents.

7. The dispersion of claim 1, wherein said dispersed phase occupies from 30 to 65 wt. % of said dispersion based on the weight of said dispersion.

8. The dispersion of claim 1, wherein said particles are substantially between 0.05 and 1 μm in diameter.

9. The dispersion of claim 8, wherein said particles are substantially between 0.05 and 0.6 μm in diameter.

10. A method for the production of a stable, aqueous artificial resin dispersion comprising the steps of:

forming an aqueous emulsion of a mixture of monomers that contains a substantial portion of a water-insoluble or slightly soluble first monomer selected from the group consisting of alkyl esters of acrylic or methacrylic acid, vinyl esters, and α-alkenylbenzenes and 0.05 to 5% by weight based on the total of all monomers present of a polymerizable emulsifier of the formula

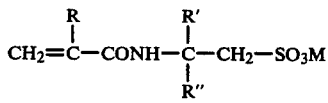

wherein R represents hydrogen or methyl,

R' represents hydrogen or an alkyl radical with 1 to 12 C-atoms,

R" represents an alkyl radical with 7 to 20 C-atoms, and

M represents a proton, an alkali metal ion, or an ammonium ion, with the proviso that the aqueous phase of said aqueous emulsion is free of ionic emulsifying agents other than said polymerizable emulsifier.

11. The method of claim 10, wherein said second monomer forms 0.01 to 5% of the total weight of all monomers present.

12. The method of claim 10, wherein said first monomer and said polymerizable emulsifier are added to an aqueous reaction mixture from which said artificial resin dispersion is formed in the form of an aqueous emulsion.

* * * * *